United States Patent
Harvey et al.

(10) Patent No.: US 10,171,311 B2
(45) Date of Patent: Jan. 1, 2019

(54) GENERATING SYNTHETIC DATA

(71) Applicant: International Business Machines Corporation, Armonk, NY (US)

(72) Inventors: Matthew C. Harvey, Richmond (GB); Niall F. McCarroll, Wokingham (GB); Yefim Shuf, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1369 days.

(21) Appl. No.: 14/056,179

(22) Filed: Oct. 17, 2013

(65) Prior Publication Data

US 2014/0115007 A1   Apr. 24, 2014

(30) Foreign Application Priority Data

Oct. 19, 2012 (GB) .................................. 1218782.9

(51) Int. Cl.
*G06F 17/30* (2006.01)
*H04L 12/24* (2006.01)

(52) U.S. Cl.
CPC ........ *H04L 41/50* (2013.01); *G06F 17/30289* (2013.01)

(58) Field of Classification Search
None
See application file for complete search history.

(56) References Cited

U.S. PATENT DOCUMENTS

| | | | |
|---|---|---|---|
| 5,864,839 A * | 1/1999 | Bourgoin | .......... G06F 17/30625 |
| 7,085,981 B2 | 8/2006 | Aggarwal | |
| 7,684,963 B2 | 3/2010 | Aggarwal | |
| 8,037,109 B2 | 10/2011 | Levine et al. | |
| 9,354,338 B1 | 5/2016 | Psaila | |
| 2003/0176931 A1* | 9/2003 | Pednault | .......... G06F 17/30539 |
| | | | 700/31 |
| 2009/0048996 A1 | 2/2009 | Bala | |
| 2011/0153575 A1 | 6/2011 | Glasser et al. | |
| 2012/0041989 A1 | 2/2012 | Banahatti et al. | |
| 2012/0330880 A1* | 12/2012 | Arasu | ............... G06F 17/30466 |
| | | | 706/52 |

OTHER PUBLICATIONS

Bentayeb et al., "Decision tree modeling with relational views," ERIC—Univeriste Lumiere Lyon May 2, 2007, 10 pages.
Garcia et al. "A Prototype of Synthetic Data Generator," This paper appears in: Computing Congress (CCC), 2011 6th Colombian, May 2011, 6 pages.
Eno et al., "Generating Synthetic Data to Match Data Mining Patterns," Architectural Perspectives, IEEE Computer Sociiety, 2008, 5 pages.
Jeske et al., "Synthetic Data Generation Capabilities for Testing Data Mining Tools," University of California, Riverside, IEEE Military Conference, 2006, 6 pages.

* cited by examiner

*Primary Examiner* — Alicia M Willoughby
(74) *Attorney, Agent, or Firm* — Cantor Colburn LLP; Richard Wilhelm

(57) ABSTRACT

A method of generating synthetic data from a model of a dataset comprises the steps of receiving a model of a dataset, extracting information from the received model, constructing a database view from the extracted information, receiving a query to the constructed database view, and generating synthetic data from the constructed database view according to the received query.

12 Claims, 7 Drawing Sheets

GENERATING SYNTHETIC DATA

PRIORITY

This application claims priority to Great Britain Patent Application No. 1218782.9, filed 19 Oct. 2012, and all the benefits accruing therefrom under 35 U.S.C. § 119, the contents of which in its entirety are herein incorporated by reference.

BACKGROUND

Customers of analytic software tools use the software to analyse their datasets. Such customers may encounter performance related issues that are data dependent and which occur only when very large volumes of data are analysed. Customers are often not able to provide the dataset to the supplier of the analytic software to help in the investigation of issues, due to confidentiality concerns and/or due to the difficulty in transporting the quantity of the data. Without access to the customer's actual datasets, the suppliers of analytic software tools may find it difficult to reproduce or understand the problems being experienced by the customer.

Suppliers of analytic software tools may attempt to replicate the issues encountered by the customer by using other similar datasets or by trying to generate synthetic data which resembles the customer's data. Often the success of this approach depends on how accurately the synthetic data resembles the original data. One known strategy is to guide the generation process using a data mining model built by the customer on their dataset. The data mining model does not contain any of actual data, but does describe rules, patterns and/or conditions that the actual data has been found to obey generally. Such models are typically small in size, and can usually be considered by a customer to contain no confidential information, so therefore they can be passed to the analytic software supplier.

One such approach is described in a paper by Eno and Thompson based on C&RT decision trees, a type of data mining model, entitled "Generating Synthetic Data to Match Data Mining Patterns", IEEE Internet Computing, June 2008, see http://csce.uark.edu/~cwt/DOCS/2008-06—IEEE-Internet-Computing—Reverse-Data-Mining—Eno-Thompson.pdf. A straightforward application of these approaches relies on the software supplier's test environment having the capacity to store large volumes of data to match those of a typical customer system. Also, the supplier may need to perform testing on behalf of many customers at the same time, leading to a likely bottleneck on storage resource.

SUMMARY

Embodiment(s) disclosed herein include a method for generating synthetic data from a model of a dataset. In some embodiments, the method includes: receiving a model of a dataset; extracting information from the received model; constructing a database view from the extracted information; receiving a query to the constructed database view; and generating synthetic data from the constructed database view according to the received query.

Embodiment(s) disclosed herein include a system for generating synthetic data from a model of a dataset. In some embodiments, the system includes a processing device arranged to receive a model of a dataset. The processing device is further arranged to extract information from the received model and to construct a database view from the extracted information. The processing device is further arranged to receive a query to the constructed database view and to generate synthetic data from the constructed database view according to the received query.

Embodiment(s) disclosed herein include a computer program product on a computer readable medium for generating synthetic data from a model of a dataset. In some embodiments, the computer program product includes instructions for: receiving a model of a dataset, extracting information from the received model, constructing a database view from the extracted information, receiving a query to the constructed database view, and generating synthetic data from the constructed database view according to the received query.

BRIEF DESCRIPTION OF THE SEVERAL VIEWS OF THE DRAWINGS

Embodiments will now be described, by way of example only, with reference to the following drawings, in which.

DETAILED DESCRIPTION

Figure 1:
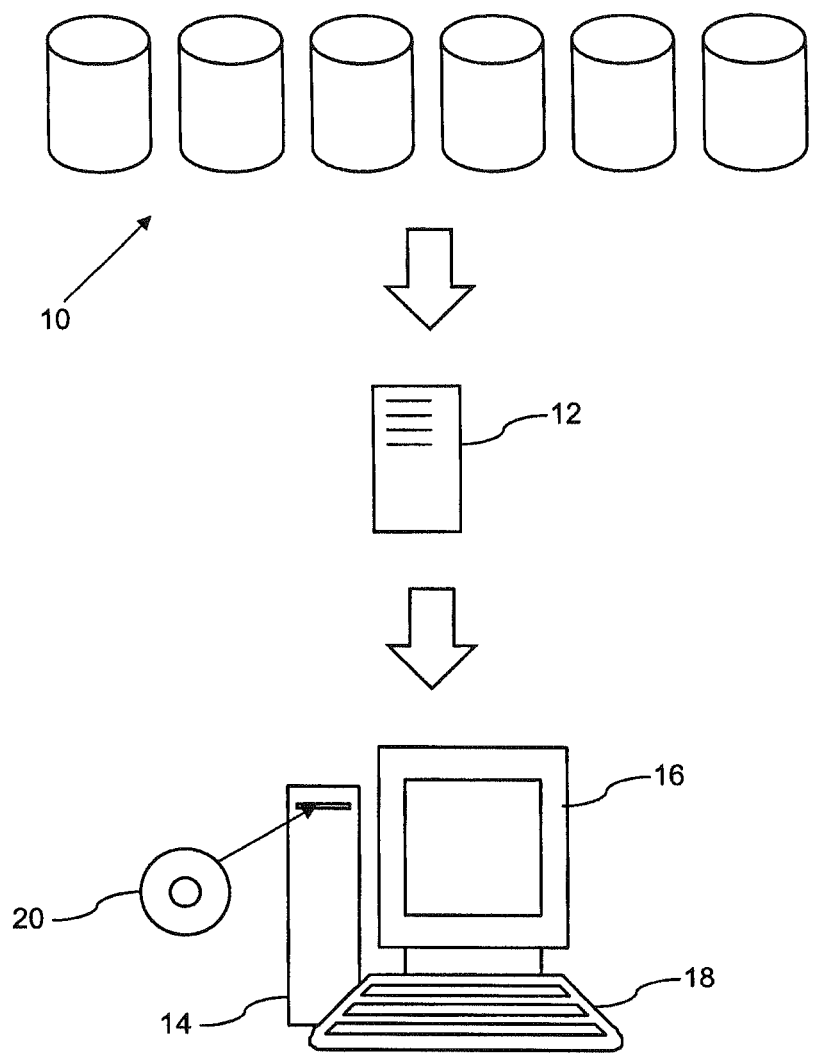
FIG. 1 is a schematic diagram of a storage array and a data processing system, in accordance with the prior art, and in which an embodiment disclosed herein may be implemented.

Embodiments disclosed herein relate to methods and systems for generating synthetic data, and, more specifically, methods and systems for an in-database generation of random synthetic test data based on a decision tree model.

Embodiment(s) disclosed herein include a system for generating synthetic data from a model of a dataset. In some embodiments, the system includes: receiving means for receiving a model of a dataset; extracting means for extracting information from the received model; constructing means for constructing a database view from the extracted information; receiving means further operable for receiving a query to the constructed database view; and generating means for generating synthetic data from the constructed database view according to the received query.

Embodiments disclosed herein include a computer program product for identifying non-distinct names in a set of names. In some embodiments, the computer program product includes: a computer readable storage medium readable by a processing circuit and storing instructions for execution by the processing circuit for performing a method according to embodiment(s) disclosed herein.

Some embodiments disclosed herein include a computer program stored on a computer readable medium and loadable into the internal memory of a digital computer, comprising software code portions, when said program is run on a computer, for performing a method according to embodiment(s) disclosed herein.

Some embodiments disclosed herein include a method and system substantially as described with reference to figures.

Some embodiments disclosed herein include a method and system that will guide the generation of synthetic data using the information encoded in a decision tree model, without actually creating the synthetic data (or instructions to a conventional data generator program to construct the synthetic dataset, as described above by Eno and Thompson), as these embodiments create a database view, for example for use by an IBM® DB2®, database. (IBM and DB2 are trademarks of International Business Machines Corporation, registered in many jurisdictions worldwide.) When a test application issues a query on this view, the synthetic data will be generated on demand using the database view. This mechanism for generating synthetic data has the advantages that there are no costs of storing the synthetic data and it follows that there is no limit imposed by the test system on the quantity of synthetic data that can be generated. This solution is particular suitable for running on a development system such as a small database running on a developer laptop.

A database view is essentially a query registered by a database and defining a set of rows which can be accessed in the same way as a database table. Views are similar to a database table in that they have a name and a fixed set of named columns. However unlike a database table, the view's rows are not stored in the database but are computed "on-demand" when the database view is read, by evaluating the view's query. A database view's query typically reads data from one or more database tables (or other views) to compute the view's contents. However, the view that will be used here does not base its query on any existing tables.

Decision tree models are a type of data mining model which define a relationship between the values of input fields (known as predictors) and an output field (known as the target) where the relationship takes the form of a tree. Internal nodes of the tree consist of decisions that depend on the value of predictor field(s) and select a particular sub-branch of the node. The leaf nodes of the tree represent predictions about the target value. For a classification tree model, the target field contains a fixed set of outcomes (for example "marital status") and the leaf nodes of the decision tree specify the most likely outcome from the set of possible outcomes. For a regression tree model, the target field contains a numeric value (for example, "salary") and the leaf nodes of the decision tree specify an estimated mean value for the target field.

The method of analysing the data model can be implemented using a computer program which reads in a description of a C&RT (classification and regression tree) decision tree model, expressed using, for example the predictive model markup language (PMML) standard, and outputs a data definition language (DDL) describing a database view which can be queried to return synthetic data that is consistent with the model. In this embodiment, the received model of a dataset includes metadata comprising field names, field types and field values and a tree structure comprising decision branches and leaf nodes. The extracting of information from the received model comprises accessing the metadata and tree structure within the received model and constructing of a database view from the extracted information comprises generating base, leaf and tree common table expressions from the accessed metadata and tree structure.

FIG. 1 shows a schematic diagram of a storage array 10 which is storing a very large amount of data. An example of such a dataset stored by the array 10 could be the medical records of patients that are held by a health care insurance company. If there is perceived to be any problems with the storage of this data, or some other data analysis needs to be performed on the dataset, then data analysis tools may be used to perform queries on the dataset. However, the size of the dataset and the confidentiality of the data stored in the array 10 means that it is very difficult to access the data directly.

For these reasons, a model 12 of the dataset is created. The data model 12 does not contain any of the actual data which is stored by the array 10, but does describe rules, patterns and/or conditions to which the actual data has been found to conform. Such data models 12 are much smaller in size than the dataset stored in the array 10, and can be considered to contain no confidential information, so can be passed to an analytic software supplier. The model 12 supports the creation of synthetic data, which is a set of data records that conform to the rules, patterns and/or conditions contained within the model 12.

The model 12 can be handled by a relatively low specification data processing system, which is shown in the lower portion of FIG. 1. A processing device 14 can receive the model 12 of the original dataset and is connected to a display device 16 and to a user interface device 18 (e.g., a conventional keyboard). The processing device 14 can be controlled by a computer program product on a computer readable medium 20 (e.g., a CD-ROM). The data processing system provides the functionality to perform analysis on the model 12 as a substitute for directly analysing the dataset stored by the array 10. A user can access the model 12 from the data processing system.

Figure 2:
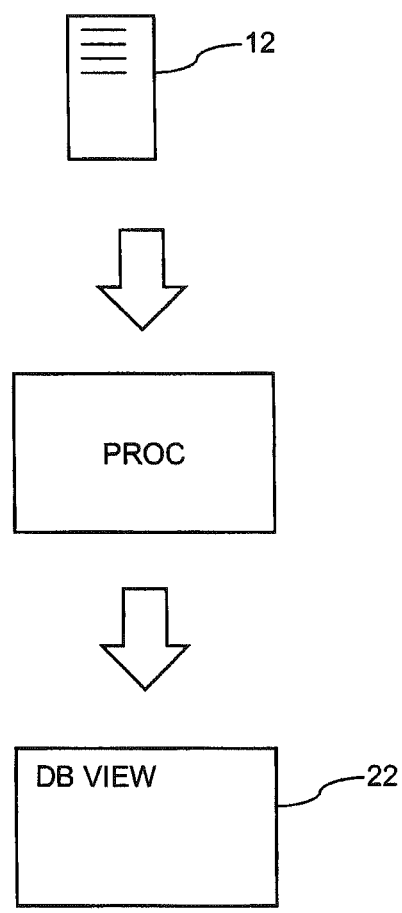
FIG. 2 is a schematic diagram of the processing of a data model into a database view, according to an embodiment disclosed herein.

The method of analysing the model 12 can be implemented using a program which reads in a description of a C&RT decision tree model, expressed using, for example the predictive model markup language (PMML) industry standard, and outputs a data definition language (DDL) describing a database view which can be queried to return synthetic data that is consistent with the model 12. This is illustrated in FIG. 2, which shows the model 12 being processed in order to generate a database view 22. The model 12 of the original dataset is turned into a database view 22, which can then be used to generate synthetic data, as and when such data is required. As will be appreciated by one skilled in the art, embodiments disclosed herein can be implemented as a system, method, computer program product or computer program. Accordingly, aspects disclosed herein may take the form of an entirely hardware embodiment, an entirely software embodiment (including firmware, resident software, micro-code, etc.) or an embodiment combining software and hardware aspects.

For a more detailed description of PMML, see www.dmg.org. The language PMML contains metadata called a data dictionary, which is in the form of a list of field names, field types and metadata on field values in the dataset used to train the model. For continuous fields, this takes the form (a) of a minimum and maximum value and for categorical fields it takes the form (b) of a listing of the valid categories. The different components defined within PMML are indicated using the references (a), (b) . . . (g), which will be followed in the text below. These references refer to components within PMML as an example of how a data model 12 can be described.

PMML also contains a description of the tree structure collected during the analysis of the training data, (c) the number of training records assigned to each leaf node, (d) the number of training records assigned to each target category (for classification models) at each leaf node, (e) the average value of the target field (for regression models) in the training records assigned to each leaf node, (f) the branch conditions assigned to each branch in the tree. A branch condition can be expressed as an IF . . . ELSE IF . . . ELSE . . . statement and (g) zero or more surrogate conditions which may be attached to each decision branch in the tree.

Figure 3:
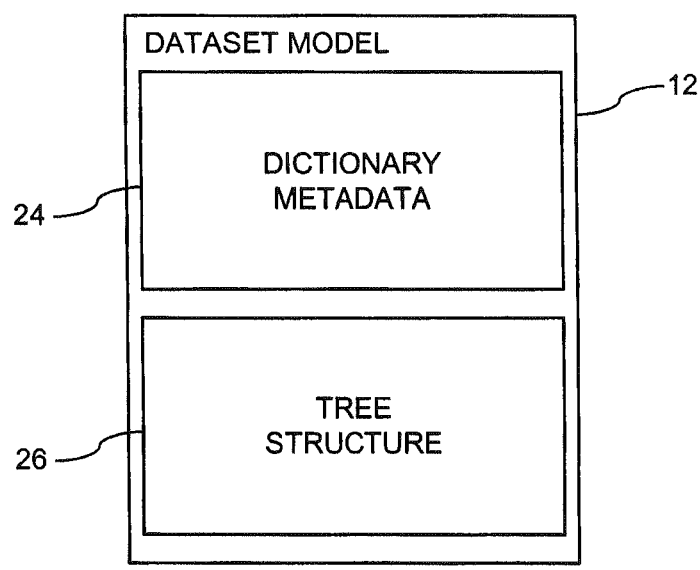
FIG. 3 is a schematic diagram of a data model, according to an embodiment disclosed herein.

To illustrate the processing, simple classification and regression trees will be considered as examples. A regression tree differs from a classification tree in that each leaf contains not a count of the occurrences of each target category, but the average of the target value. Surrogate rules are a feature of models generated by the classification and regression trees model and are not present in models generated by other decision tree algorithms. The example classification tree will try to predict which drug (out of possibilities drugX and drugY) will work best for a patient, given the patient's age, blood pressure and potassium level. An example of a model 12 is shown in FIG. 3, which includes dictionary metadata 24 and a tree structure 26 of leaf nodes and branch conditions. The model 12 will contain:
(a) and (b) data dictionary metadata:
AGE: Integer, continuous, predictor, between 15 and 74
BP: String, categorical, predictor, values in the set {NORMAL, HIGH}
K: Real, continuous, predictor, values between 0.02 and 0.43
DRUG: String, categorical, target, values in the set {drugX, drugY}
(c), (d), (e) and (f) tree structure based on thirty-two training records:
IF AGE>45 (surrogates: K>0.21):
IF BP is NORMAL (surrogates: AGE>60):
LEAF 1 (4 records):
drugX: 3 records
drugY: 1 records
ELSE
LEAF 2 (16 records):
drugX: 4 records
drugY: 12 records
ELSE
IF K<0.18
LEAF 3 (8 records):
drugX: 2 records
drugY: 6 records
ELSE
LEAF 4 (4 records):
drugX: 2 records
drugY: 2 record The example regression tree will try to predict which drug dosage level (in the range 0.0-1.0) will work best for a patient, given the patient's age, blood pressure and potassium level.

The model 12 will contain:
(a) and (b) data dictionary metadata:
AGE: Integer, continuous, predictor, between 15 and 74
BP: String, categorical, predictor, values in the set {NORMAL, HIGH}
K: Real, continuous, predictor, values between 0.02 and 0.43
DRUGDOSAGE: continuous, target, values between 0.07 and 0.81

(c), (d), (e) and (f) tree structure based on 32 training records:
IF AGE>45 (surrogates: K>0.21):
IF BP is NORMAL (surrogates: AGE>60):
LEAF 1 (4 records):
DRUGDOSAGE: 0.41
ELSE
LEAF 2 (16 records):
DRUGDOSAGE: 0.71
ELSE
IF K<0.18
LEAF 3 (8 records):
DRUGDOSAGE: 0.14
ELSE
LEAF 4 (4 records):
DRUGDOSAGE: 0.32

Figure 4:
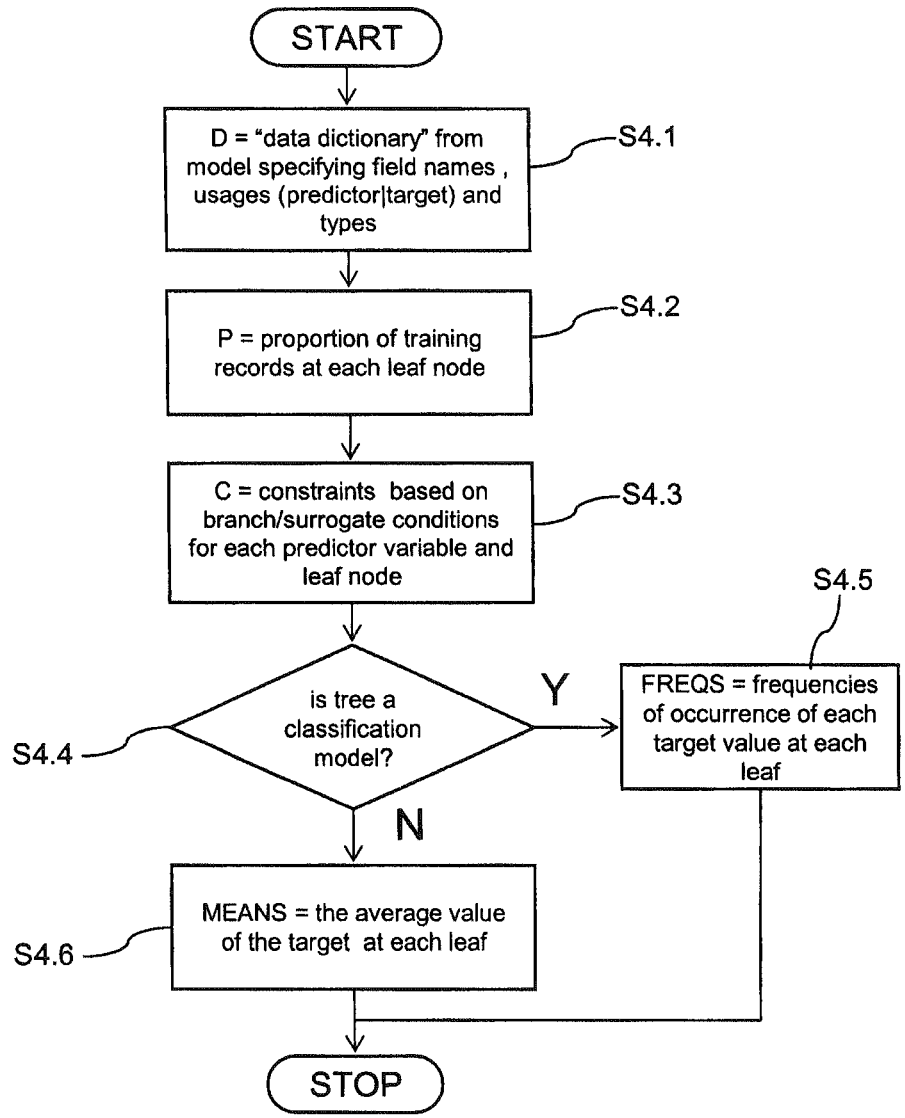
FIG. 4 is a flowchart of a method of extracting information from a data model, according to an embodiment disclosed herein.

The synthetic data generation takes place in the following manner. The first part of this process is to extract information from the tree model, as shown in the flowchart of FIG. 4. At block S4.1 information is extracted on the field names and types in the dataset, which is assigned to variable D. At step S4.2, based on the number of training records assigned to each leaf, there is generated the probability of a record being assigned to each leaf in the tree, which is assigned to variable P. For the example trees above, this would be as follows:
P(LEAF1)=4/32=0.125
P(LEAF2)=16/32=0.5
P(LEAF3)=8/32=0.25
P(LEAF4)=4/32=0.125

At block S4.3, for each LEAF node, the constraints on predictor fields are extracted, for records assigned to that leaf, and this is assigned to variable C. For the example trees above, this would be as follows:
C(LEAF1): AGE>45 and K>0.21 and BP=NORMAL and Age>60
C(LEAF2): AGE>45 and K>0.21 and BP=NORMAL and Age<60
C(LEAF3): AGE<=45 and K<=0.21 and K<0.18
C(LEAF4): AGE<=45 and K<=0.21 and K>=0.18

At block S4.4, a check is made to see if the tree is a classification tree or not. If yes then the process continues to block S4.5, where, for classification models, there is worked out the conditional probabilities of each value of the target field for each leaf, and assign to the variable FREQS. For the example classification tree above, this would be as follows:
FREQS(LEAF1)=[P(Drug=drugX)=3/4=0.75, P(Drug=drugY)=1/4=0.25]
FREQS(LEAF2)=[P(Drug=drugX)=4/12=0.25, P(Drug=drugY)=8/4=0.75]
FREQS(LEAF3)=[P(Drug=drugX)=2/8=0.25, P(Drug=drugY)=6/8=0.7]
FREQS(LEAF4)=[P(Drug=drugX)=2/4=0.5, P(Drug=drugY)=2/4=0.5]

For regression models, then the process moves to block S4.6 and the mean values of the target field for each leaf are assigned to MEANS. For the example regression tree above, this would be as follows:
MEANS(LEAF1)=0.41
MEANS(LEAF2)=0.71
MEANS(LEAF3)=0.14
MEANS(LEAF4)=0.32

Figure 5:
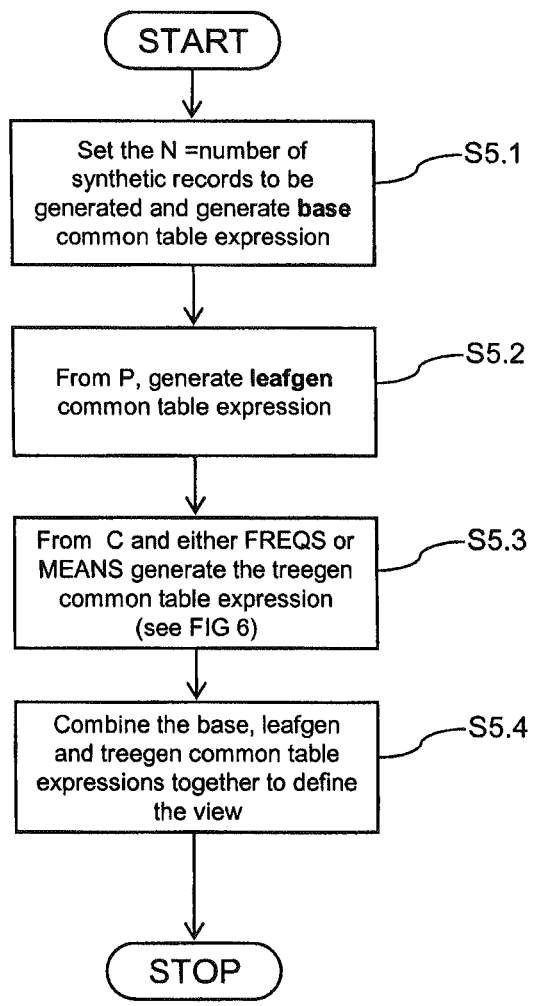
FIG. 5 is a flowchart of a method of constructing a database view from the extracted information, according to an embodiment disclosed herein.
Figure 6:
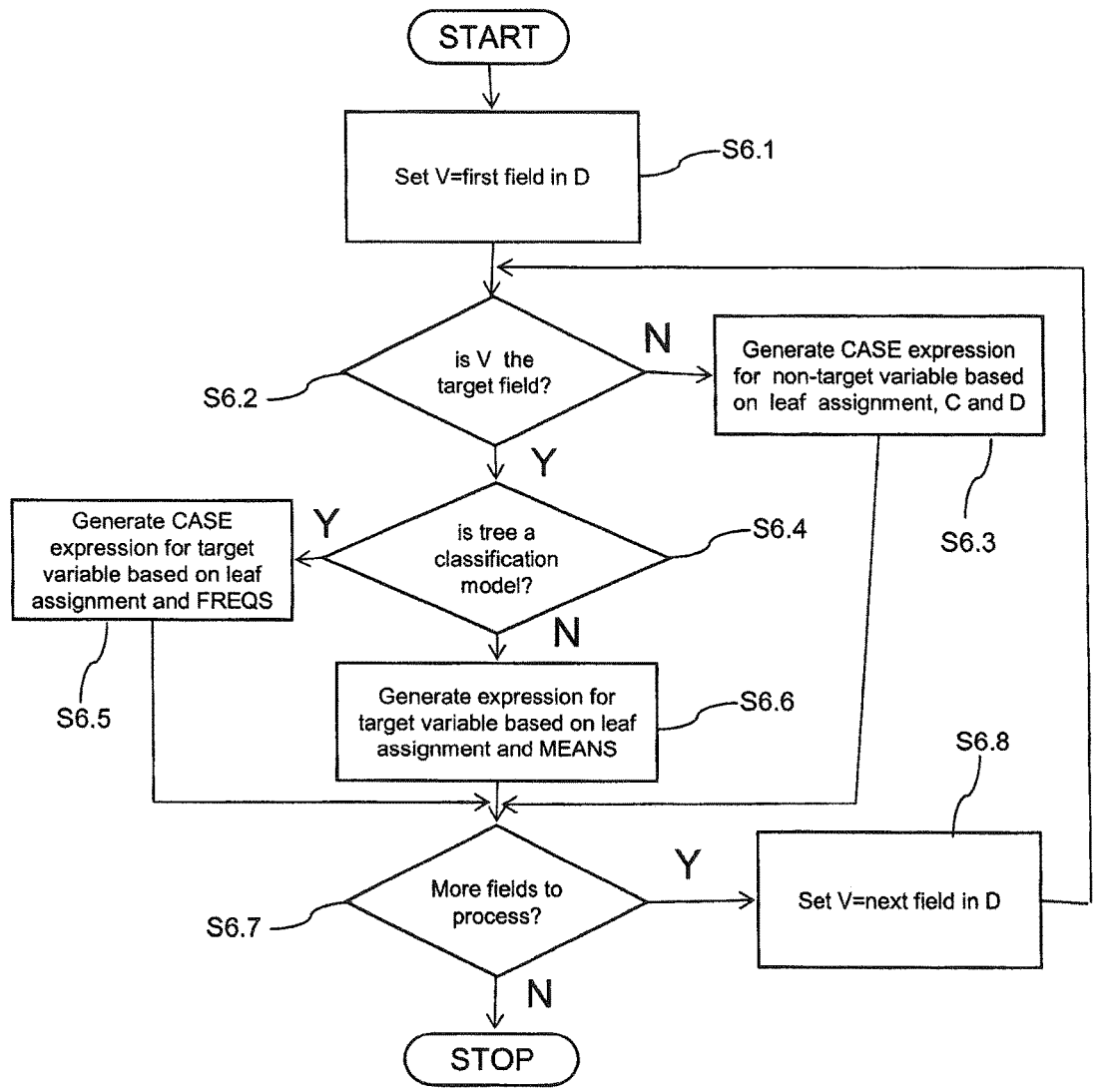
FIG. 6 is a flowchart showing more detail of one step in the method of FIG. 5, according to an embodiment disclosed herein.

Next, a database view 22 is constructed in order to be able to generate synthetic data, as shown in the flowcharts of FIGS. 5 and 6. In some embodiments, the database view 22 is assembled by generating and combining fragments of SQL using the four steps of FIG. 5. At block S5.1, the process decides how many synthetic records the database view should generate, in this example 1000 records are to be generated. This is achieved by constructing the base common table expression for this view incorporating the number of records.

base(num,rnd) AS
(VALUES(0,NULL) UNION ALL SELECT num+1, RAND( ) from base WHERE num<1000)

At block S5.2, according to the probabilities generated in the process of FIG. 4 and assigned to P, the leafgen common table expression is generated to assign each randomly generated record to a leaf node, and generate random numbers for each field in the data dictionary (these will be used later to synthesize values). The thresholds in the CASE expression generated reflect the cumulative probabilities for each leaf in P. In the example, the common table expression generated is:

leafgen(leaf,AGE,BP,K,DRUG) AS
(SELECT case when rnd<0.125 then 1 when rnd<0.625 then 2 when rnd<0.875 then 3 else 4 end as leaf, RAND( ) as AGE, RAND( ) as BP, RAND( ) as K, RAND( ) as DRUG from base where num>0)

In the next block, S5.3, the treedata common table expression assigning values to the predictor fields and target field of each synthetic record of the view is created, using the assignment of each synthetic record to a leaf node computed in step S5.2, and the data dictionary D, constraints C and either the MEANS or FREQS (depending on the type of tree) information collected in the process of FIG. 4. This step is described in more detail below and is covered in the flowchart in FIG. 6. The template for the treedata common table expression is:

treedata(AGE,BP,K,DRUG) AS
(SELECT
case . . .
end as . . . ,
. . .
case . . .
end as . . .
FROM leafgen)

For each field in the data dictionary D, an SQL case expression is created to assign random values to the field and added to the template, as shown in the flowchart of FIG. 6. At block S6.1, the variable V is set to the first field in D. At step S6.2, a check is made to see if the field is the target field. If the answer is yes, then the process moves to block S6.4 where a further check is made to see if the tree is a classification model or not. The case expression is constructed according to whether the tree model is a classification model or a regression model.

If the tree is a classification model, then the process moves to block S6.5 and depending on the leaf L allocated to each synthetic record, there is assigned the value to the target field based on the conditional probabilities recorded in FREQS(L) and the random number assigned to the target field by the leafgen common table expression. For the classification tree example:
case
when leaf=1 then (case when DRUG<0.75 then 'drugX' else 'drugY' end)
when leaf=2 then (case when DRUG<0.25 then 'drugX' else 'drugY' end)
when leaf=3 then (case when DRUG<0.25 then 'drugX' else 'drugY' end)
else (case when DRUG<0.5 then 'drugX' else 'drugY' end)
end as DRUG If the tree is a regression model, then the process moves to block S6.6 and depending on the leaf L allocated to each synthetic record, there is assigned the value to the target field based on the mean value recorded in MEANS(L).
case
when leaf=1 then 0.41
when leaf=2 then 0.71
when leaf=3 then 0.14
else 0.32
end as DRUGDOSAGE If the check at block S6.2 means that the field is not the target field, then the process moves to block S6.3 and creates a synthetic random value for the field, based on the range of values for the field, specified in the data dictionary D and for the leaf L assigned to each synthetic record, any limits placed upon the field values in the constraints for that leaf, C(L). An example for a categorical non-target field such as BP might be:
case
when leaf=1 then 'NORMAL'
when leaf=2 then 'HIGH'
else (case when BP>0.5 then 'NORMAL' else 'HIGH' end)
end as BP, An example for a continuous non-target field such as age might be:
case
when leaf=1 then 60+(AGE*14)
when leaf=2 then 45+(AGE*15)
else 15+(AGE*30)
end as AGE, The expression to create the synthetic value should allow any value to be equally likely within these constraints. At block S6.7 a check is made to see if there are any further fields to process. If yes then, the process moves to block S6.8 and V is set to the next field in D and the process returns to block S6.2. Once all the fields within D have been processed in this manner, then the process will terminate.

The final database view definition is then formed, at block S5.4 of FIG. 5, by substituting the base, leafgen and treedata common table expressions into the following template for the view:
create view SYNTHETIC as
WITH <base definition>, <leafgen-definition>, <treegen-definition>
SELECT * FROM treegen The full SQL DDL for a view to generate 1000 synthetic records based on the example classification tree is:
create view SYNTHETIC as
WITH base(num,rnd) AS
(VALUES(0,NULL) UNION ALL SELECT num+1, RAND( ) from base WHERE num<1000),
leafgen(leaf,AGE,BP,K,DRUG) AS
(SELECT case when rnd<0.125 then 1 when rnd<0.625 then 2 when rnd<0.875 then 3 else 4 end as leaf, RAND( ) as AGE, RAND( ) as BP, RAND( ) as K, RAND( ) as DRUG from base where num>0),
treedata(AGE,BP,K,DRUG) AS
(SELECT
case
when leaf=1 then 60+(AGE*14)
when leaf=2 then 45+(AGE*15)
else 15+(AGE*30)
end as AGE,
case
when leaf=1 then 'NORMAL'
when leaf=2 then 'HIGH'
else (case when BP>0.5 then 'NORMAL' else 'HIGH' end)

end as BP,
case
when (leaf=1 or leaf=2) then 0.21+(K*0.22)
when leaf=3 then 0.02+(K*0.16)
else 0.18+(K*0.03)
end as K,
case
when leaf=1 then (case when DRUG<0.75 then 'drugX' else 'drugY' end)
when leaf=2 then (case when DRUG<0.25 then 'drugX' else 'drugY' end)
when leaf=3 then (case when DRUG<0.25 then 'drugX' else 'drugY' end)
else (case when DRUG<0.5 then 'drugX' else 'drugY' end)
end as DRUG
FROM leafgen)
SELECT * FROM treedata The full SQL DDL for a view to generate 1000 synthetic records based on the example regression tree is:
create view SYNTHETIC as
WITH base(num,rnd) AS
(VALUES(0,NULL) UNION ALL SELECT num+1, RAND( ) from base WHERE num<1000),
leafgen(leaf,AGE,BP,K,DRUGDOSAGE) AS
(SELECT case when rnd<0.125 then 1 when rnd<0.625 then 2 when rnd<0.875 then 3 else 4 end as leaf, RAND( ) as AGE, RAND( ) as BP, RAND( ) as K, RAND( ) as DRUGDOSAGE from base where num>0),
treedata(AGE,BP,K,DRUGDOSAGE) AS
(SELECT
case
when leaf=1 then 60+(AGE*14)
when leaf=2 then 45+(AGE*15)
else 15+(AGE*30)
end as AGE,
case
when leaf=1 then 'NORMAL'
when leaf=2 then 'HIGH'
else (case when BP>0.5 then 'NORMAL' else 'HIGH' end)
end as BP,
case
when (leaf=1 or leaf=2) then 0.21+(K*0.22)
when leaf=3 then 0.02+(K*0.16)
else 0.18+(K*0.03)
end as K,
case
when leaf=1 then 0.41
when leaf=2 then 0.71
when leaf=3 then 0.14
else 0.32
end as DRUGDOSAGE
FROM leafgen)
SELECT * FROM treedata This example works in IBM DB2. A similar approach may be taken in other SQL dialects which is applicable to other database management systems. For example, in some embodiments utilizing Oracle databases, the block S5.1 and S5.2 are modified slightly to use a different SQL syntax.

S5.1 modified SQL for Oracle:
base(num,rnd) AS (SELECT LEVEL num, DBMS_RANDOM.VALUE rnd FROM dual CONNECT BY LEVEL<=1000)

S5.2 modified SQL for Oracle for the classification tree example:
leafgen(leaf,AGE,BP,K,DRUG) AS
(SELECT case when rnd<0.125 then 1 when rnd<0.625 then 2 when rnd<0.875 then 3 else 4 end as leaf, DBMS_RANDOM.VALUE as AGE, DBMS_RANDOM.VALUE as BP, DBMS_RANDOM.VALUE as K, DBMS_RANDOM.VALUE as DRUG from base where num>0)

In this way, queries can be applied to the constructed database view which will generate the synthetic data needed according to the received query. By converting the received model into a database view, there is no need to store any synthetic data until that data is actually created by a query to the database view. This reduces the storage requirement significantly and creates a much greater flexibility from the point of view of the data analyst that will perform the analysis of the synthetic data, as the amount of synthetic data to be created is easily controlled by the query applied to the database view.

Figure 7:
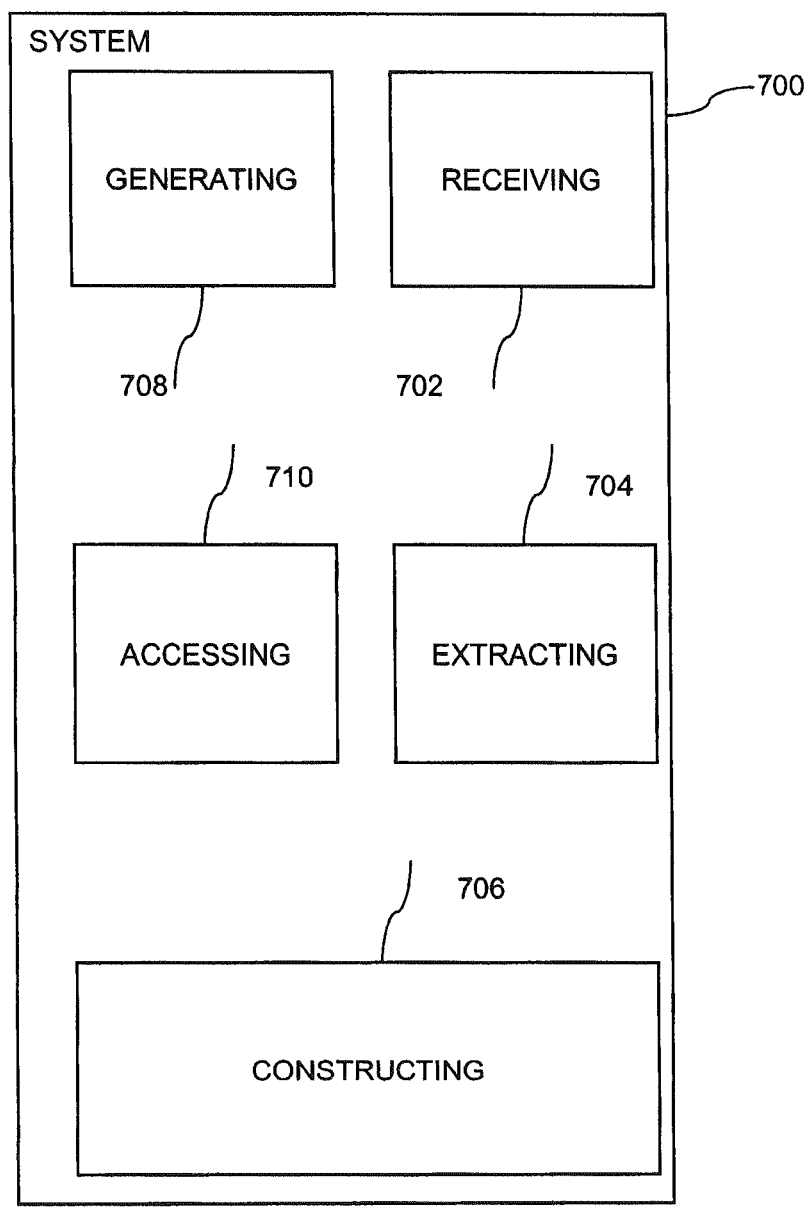
FIG. 7 depicts a system for generating synthetic data from a model of a dataset, according to an embodiment disclosed herein.

FIG. 7 depicts a system 700 for generating synthetic data from the model 12 of a dataset, according to various embodiments disclosed herein. The system 700 comprises: receiving means 702 for receiving the model 12 of the dataset, and for receiving a query to a constructed database view; extracting means 704 for extracting information from the received model; constructing means 706 for constructing the database view from the extracted information; generating means 708 for generating synthetic data from the constructed database view according to the received query, and, responsive to constructing the database view from the extracted information, for generating base, leaf and tree common table expressions from the accessed metadata and tree structure; and accessing means 710, responsive to extracting information from the received model, for accessing the metadata and tree structure within the received model. A database can be constructed, for example, in software, or as elements of a memory array.

As will be appreciated by one skilled in the art, aspects disclosed herein may be embodied as a system, method, computer program product or computer program. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of embodiments disclosed herein may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java, all Java-based trademarks and logos, and Oracle are trademarks or registered trademarks of Oracle and/or its affiliates.

Aspects of embodiments disclosed herein are described below with reference to flowchart illustrations and/or block diagrams of methods, apparatus (systems) and computer program products according to embodiments disclosed herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The term "comprising", as used herein throughout the description and claims is not to be construed as meaning "consisting only of".

The invention claimed is:

1. A method comprising:
receiving a model of a dataset, wherein the received model of the dataset includes a tree structure comprising decision branches and leaf nodes;
extracting information from the received model by accessing metadata and a tree structure within the received model;
wherein the extracting information from the received model comprises extracting information on field names and types in the dataset, generating a probability of a record being assigned to each leaf in the tree in response to the number of training records assigned to each leaf and extracting constraints on predictor fields for records assigned to that leaf for each leaf node, and
wherein the extracting information from the received model comprises determining whether the tree structure is a classification tree, in response to the tree structure being a classification tree, determining conditional probabilities of each value of a target field for each leaf, and in response to the tree structure not being a classification tree, determining mean values of the target field for each leaf;
constructing a database view from the extracted information; receiving a query to the constructed database view; and
generating synthetic data from the constructed database view according to the received query, the generating includes generating a base common table expression that incorporates a number of records to be generated, generating a leaf common table expression that assigns each randomly generated record to a leaf node and generates random numbers for each field in a data dictionary; and generating a tree common table expression that assigns values to the predictor fields and target field of each synthetic record of the view, wherein all three common table expressions are generated from the accessed metadata and tree structure and are combined to define the view.

2. The method of claim 1, wherein the received model of the dataset includes metadata comprising the field names, field types, and field values.

3. The method of claim 2, wherein extracting information from the received model comprises accessing the metadata and tree structure within the received model.

4. The method of claim 3, wherein constructing a database view from the extracted information comprises generating base, leaf, and tree common table expressions from the accessed metadata and tree structure.

5. A system comprising:
a hardware processor configured to execute a synthetic data generator module, the synthetic data generator module configured for:
receiving a model of a dataset, wherein the received model of the dataset includes a tree structure comprising decision branches and leaf nodes;
extracting information from the received model by accessing metadata and a tree structure within the received model;
wherein the extracting information from the received model comprises extracting information on field names and types in the dataset, generating a probability of a record being assigned to each leaf in the tree in response to the number of training records assigned to each leaf and extracting constraints on predictor fields for records assigned to that leaf for each leaf node, and
wherein the extracting information from the received model comprises determining whether the tree structure is a classification tree, in response to the tree structure being a classification tree, determining conditional probabilities of each value of a target field for each leaf, and in response to the tree structure not being a classification tree, determining mean values of the target field for each leaf;
constructing a database view from the extracted information; receiving a query to the constructed database view; and
generating synthetic data from the constructed database view according to the received query, the generating includes generating a base common table expression that incorporates a number of records to be generated, generating a leaf common table expression that assigns each randomly generated record to a leaf node and generates random numbers for each field in a data dictionary; and generating a tree common table expression that assigns values to the predictor fields and target field of each synthetic record of the view, wherein all three common table expressions are generated from the accessed metadata and tree structure and are combined to define the view.

6. The system of claim 5, wherein the received model of the dataset includes metadata comprising the field names, field types, and field values.

7. The system of claim 6, wherein the synthetic data generator module is further configured to, responsive to extracting information from the received model, access the metadata and tree structure within the received model.

8. The system of claim 7, wherein the synthetic data generator module is further configured to, responsive to constructing a database view from the extracted information, generate base, leaf, and tree common table expressions from the accessed metadata and tree structure.

9. A computer program product for generating synthetic data from a model of a dataset, the computer program product comprising a computer readable storage medium having program code embodied therewith, the program code executable by a processing circuit to perform a method comprising:
receiving a model of a dataset, wherein the received model of the dataset includes a tree structure comprising decision branches and leaf nodes;
extracting information from the received model by accessing metadata and a tree structure within the received model;
wherein the extracting information from the received model comprises extracting information on field names and types in the dataset, generating a probability of a record being assigned to each leaf in the tree in response to the number of training records assigned to each leaf and extracting constraints on predictor fields for records assigned to that leaf for each leaf node, and
wherein the extracting information from the received model comprises determining whether the tree structure is a classification tree, in response to the tree structure being a classification tree, determining conditional probabilities of each value of a target field for each leaf, and in response to the tree structure not being a classification tree, determining mean values of the target field for each leaf;
constructing a database view from the extracted information; receiving a query to the constructed database view; and
generating synthetic data from the constructed database view according to the received query, the generating includes generating a base common table expression that incorporates a number of records to be generated, generating a leaf common table expression that assigns each randomly generated record to a leaf node and generates random numbers for each field in a data dictionary; and generating a tree common table expression that assigns values to the predictor fields and target field of each synthetic record of the view, wherein all three common table expressions are generated from the accessed metadata and tree structure and are combined to define the view.

10. The computer program product of claim 9, wherein the received model of the dataset includes metadata comprising the field names, field types, and field values.

11. The computer program product of claim 10, wherein the program code is further executable by the processor circuit to access the metadata and tree structure within the received model, responsive to extracting information from the received model.

12. The computer program product of claim 11, wherein the program code is further executable by the processor circuit to generate base, leaf, and tree common table expressions from the accessed metadata and tree structure, responsive to constructing a database view from the extracted information.

* * * * *